(No Model.)

K. HEDBERG.
EGG CUTTER.

No. 562,605. Patented June 23, 1896.

WITNESSES:
C Gerst
A. Armstrong

INVENTOR.
Karl Hedberg,
BY Edgar Tate & Co
ATTORNEYS.

UNITED STATES PATENT OFFICE.

KARL HEDBERG, OF NEWPORT, RHODE ISLAND.

EGG-CUTTER.

SPECIFICATION forming part of Letters Patent No. 562,605, dated June 23, 1896.

Application filed November 21, 1895. Serial No. 569,609. (No model.)

*To all whom it may concern:*

Be it known that I, KARL HEDBERG, a citizen of the United States, and a resident of Newport, in the county of Newport and State of Rhode Island, have invented certain new and useful Improvements in Egg-Cutters, of which the following is a specification, reference being had to the accompanying drawings, forming a part thereof, in which similar letters of reference indicate corresponding parts.

This invention relates to devices for cutting off the ends of eggs or the shells thereof; and the object of the invention is to provide a device for this purpose, which is simple in construction and operation, and by means of which the end of an egg may be broken off without breaking the rest of the shell.

The invention is fully disclosed in the following specification, of which the accompanying drawings form a part, in which—

Figure 1:
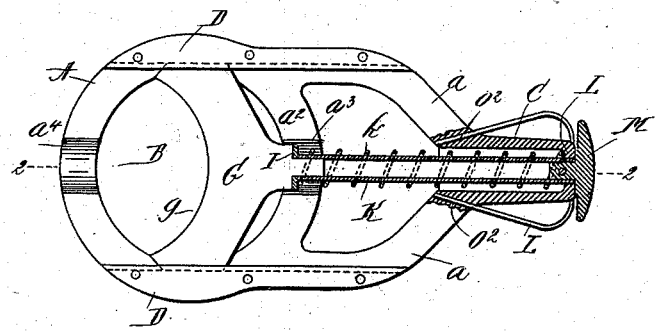
Figure 2:
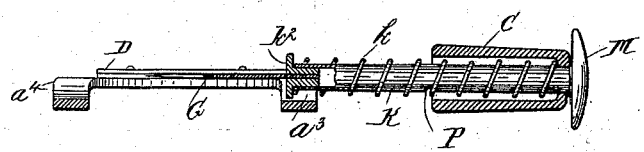

Figure 1 is a plan view of my improvement, parts thereof being shown in section. Fig. 2 is a section on the line 2 2 of Fig. 1, and Fig. 3 a plan view showing the parts in position for operation.

In the practice of my invention, I provide a frame A, which is oblong in form, and provided with a circular opening B, and said frame is provided at one end with projecting arms $a$, which connect with a tubular head or projection C, provided with guides or ways D. Mounted in the guides or ways D and adapted to slide therein is a cutter G, provided with a cutting edge $g$, which may be segmental in form, convex, straight, or any preferred shape, and said cutter is provided with a stem or shank K, on which is mounted a spring $k$, one end of which bears upon the cutter G and the other end of which bears upon an inwardly-directed annular shoulder L, formed on the outer end of the tubular head C, through which the stem or shank K projects, and said stem or shank is provided at its outer end with a button or head M.

Figure 3:
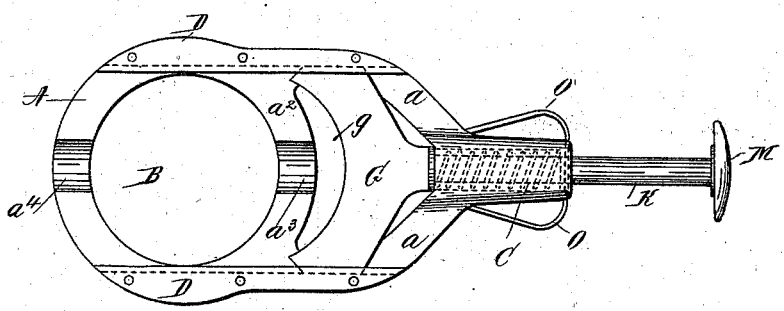

The frame A is provided with a curved cross-piece $a^2$, which forms a part thereof, and part of the wall of the circular opening B and said cross-piece is provided with a semicircular cavity or recess $a^3$, through which passes the inner end of the stem or shank K of the cutter G, said stem or shank being provided with a head $k^2$, with which the cutter is connected, as shown in Fig. 1, and the central outer portion of the frame A is provided with a similar semicircular cavity or recess $a^4$. I also provide a spring O, the inner ends of which are secured to the frame at $O^2$, and said spring is extended outwardly and is inwardly directed across the outer end of the tubular extension or head C, and is adapted to operate in connection with a notch or recess P, formed in the stem or shank K, and to hold the same in the extended position, as shown in Fig. 3, and the object of the semicircular cavity or recess $a^4$ is to provide means for drawing the cutter from the frame, which may be done by removing the button or head M.

The operation will be readily understood from the foregoing description when taken in connection with the accompanying drawings. By taking hold of the button or head M and drawing the cutter out, as shown in Fig. 3, the spring O will operate in connection with the notch or recess P to hold the cutter in this position against the operation of the spring $k$, and the end of an egg being placed in the circular opening B, a slight pressure on the spring O will release the spring $k$ and the cutter will be driven forward thereby, and the end of the egg cut off, as will be readily understood.

The device herein described may be made of any desired metal or material, and my invention is not limited to the exact form, construction, and arrangement of parts herein shown and described, and I therefore reserve the right to make all such alterations therein, and modifications thereof, as fairly come within the scope of the invention.

Having fully described my invention, I claim and desire to secure by Letters Patent—

As a new article of manufacture, an egg-cutting machine constructed substantially as herein shown and described, consisting of an oblong frame having on one end a circular opening within which is a sliding cutter about the projecting shank of which is fixed a coiled spring; projecting arms integral with said frame and supporting a tubular head provided with guides for said sliding cutter; a curved cross-piece forming part of the wall of the circular opening in said frame and provided with an opening for the passage of the cutter-shank; a corresponding opening in the frame to permit the withdrawal of the cutter from the frame and a spring arranged to hold the cutter-shank out in normal position, all constructed and arranged as and for the purpose set forth.

In testimony that I claim the foregoing as my invention I have signed my name, in presence of the subscribing witnesses, this 14th day of November, 1895.

KARL HEDBERG. [L. S.]

Witnesses:
M. DRISCOLL,
G. H. BARKER.